Oct. 22, 1957 — E. E. HARDESTY — 2,810,816
WELDING METHODS AND APPARATUS
Filed Sept. 20, 1955 — 2 Sheets-Sheet 1

INVENTOR.
ETHRIDGE E. HARDESTY
BY Campbell, Brumbaugh, Free & Graves
his ATTORNEYS Oct. 22, 1957 E. E. HARDESTY 2,810,816

WELDING METHODS AND APPARATUS

Filed Sept. 20, 1955 2 Sheets-Sheet 2

INVENTOR.
ETHRIDGE E. HARDESTY
BY
Campbell, Brumbaugh, Free & Graves
his ATTORNEYS

# United States Patent Office 2,810,816
Patented Oct. 22, 1957

2,810,816
WELDING METHODS AND APPARATUS

Ethridge E. Hardesty, Balboa Island, Calif., assignor to Fairchild Engine and Airplane Corporation, Hagerstown, Md., a corporation of Maryland Application September 20, 1955, Serial No. 535,463

12 Claims. (Cl. 219—82)

This invention relates to resistance welding of metal sheets to the edges of thin walled metal elements and, more particularly, to such welding in which a metal form must be employed to support a portion of the composite structure to be welded.

In resistance welding of various structures, the components to be joined are assembled on a supporting form in a desired manner. For instance, in producing a sandwich structure having a selected configuration from a pair of metal sheets welded to both edges of a honeycomb type metal core, at least one of the metal sheets must be supported on an appropriately shaped form.

Improved methods for resistance welding composite metal structures, such as the above-mentioned metal sandwich, have been fully disclosed in copending applications Serial Nos. 449,306, filed August 12, 1954, and 560,371, filed January 20, 1956, by James R. Campbell, Serial No. 474,863, filed December 13, 1954, by Ethridge E. Hardesty and 475,137, filed December 14, 1954, by Elmer R. Wirta. However, while the processes disclosed in these applications form the basis for the efficient welding of metal sandwich structure, it is necessary to employ them with metal supporting forms in order to produce welded structures of various configurations.

Previous attempts to support sandwich assemblies by means of metal forms of a suitable configuration have not met with much success. This is due to the fact that the current flowing from an electrode engaging such a form diffuses sufficiently before reaching the assembly to sharply reduce the heating effects necessary for providing an efficient weld. Various expedients have failed to overcome such diffusion, one of these being to construct the metal supporting form of independent bars, the bars being sequentially removed in order to permit passage of a welding electrode along the sandwich structure directly in contact with the outer metal sheet. Another unsuccessful attempt to solve the diffusion problem involved the use of a slotted metal form permitting a wheel type electrode to engage a skin through the slots, the form then being shifted after a number of passes of the electrode to permit the electrode to traverse the previously supported portions.

The present invention overcomes the above difficulties by the use of a metal supporting form having one major face engaging and supporting a metal sheet of the composite structure, insulation layers dividing the metal form into a plurality of electrically independent sections. These sections extend between the major faces of the form to permit current flow therebetween. However, the insulation layers preclude lateral current flow between adjacent sections of the form so that the current from an electrode abutting one section of the metal core will not be diffused beyond that section. Of course, the area of the section is determined so that the metal sheet will be efficiently welded to the edge of an abutting core or other metal element.

In one embodiment of the invention, the metal form consists of a number of blocks insulated by layers of insulation preferably formed by an insulating adhesive to secure the blocks in position.

In another embodiment of the invention, suitable for use when the composite structure configuration requires an extreme curvature of the supporting form, strips extending between the edges of the metal form are insulated by layers of suitable materials. Although some diffusion of current occurs with this arrangement, it is not great enough to preclude sufficient heating for providing an effective welded joint between the metal sheet and the thin walled core.

These and further advantages of the present invention will be more readily understood when the following description is read in connection with the accompanying drawings in which.

Figure 1:
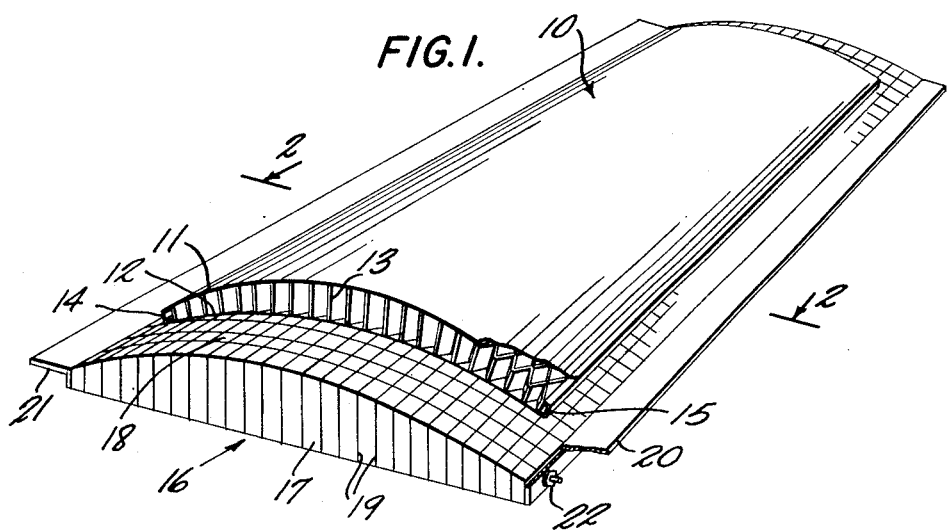
Figure 1 is a perspective view illustrating a metal form in accordance with the principles of the present invention supporting a composite structure to be welded.

Referring to the invention in greater detail with particular reference to Figure 1, a composite structure 10 includes upper and lower sheets 11 and 12, a honeycomb core 13 and C-shaped edge closure pieces 14 and 15 extending therebetween. Composite structures of this type are often referred to as metal sandwiches, the sheets 11 and 12 being substantially thicker than the thin walled honeycombed core 13. It should be noted that for clarity, the wall thickness of the core 13 has been exaggerated. The basic methods for resistance welding such sandwiches have been disclosed in the above-referred to copending applications which teach the use of a high conductivity layer of metal plated on the core in order to increase the strength of the weld joint between the skins and the core. In addition, these aplications disclose processes for obtaining spaced welded joints between the abutting elements.

A metal form 16 supporting the metal sandwich 10 is constructed of a number of individual vertically oriented bars 17 of a suitable metal such as copper or what is termed electrode copper alloy. The bars 17 are assembled to provide a surface 18 having the configuration of the plate 12, thin layers 19 of insulation being provided between all surfaces facing each other on adjacent bars. In many instances, it is preferable to employ an insulating adhesive to form the layers 19 which will electrically isolate the bars 17 and aid in holding them together.

L-shaped flanges 20 and 21 are disposed along opposite edges of the form 16 and joined thereto by the layers 19 and insulated tie rods 22, which extend through the bars 17. This arrangement secures the bars 17 together. Obviously, as many of the tie rods 22 as desired may be employed, the number being dependent upon the particular configuration of the metal form 16.

Figure 3:
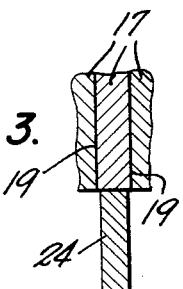
Figure 3 is a partial transverse section through one electrode and the form in Figure 2 taken on the view line 3—3 looking in the direction of the arrows.
Figure 2:
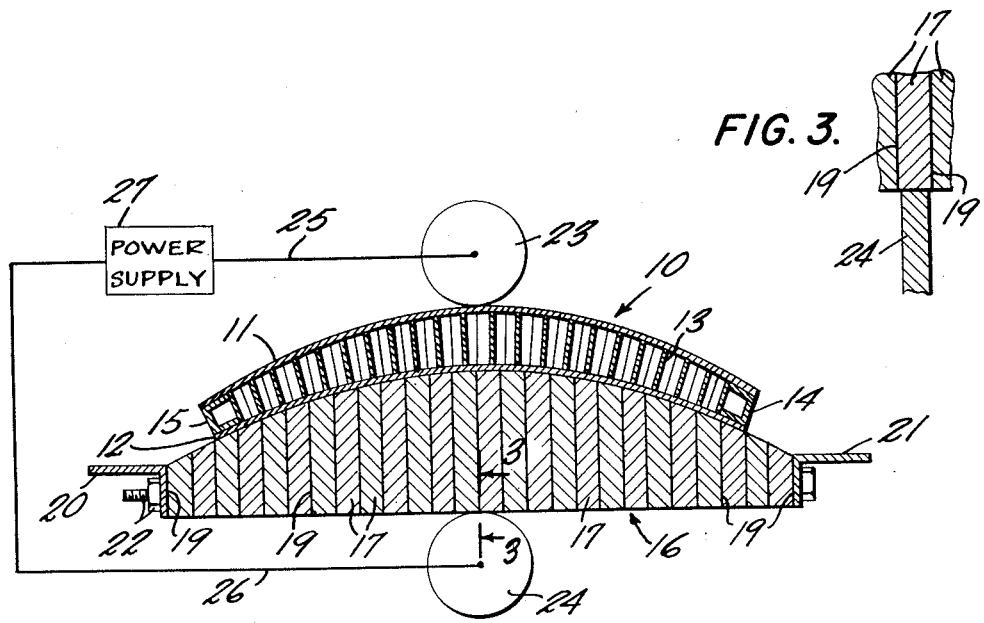
Figure 2 is a transverse section of the apparatus shown in Figure 1, electrodes added, taken on the view line 2—2 looking in the direction of the arrows.

Referring to Figure 2, wheel type welding electrodes 23 and 24 are shown engaging the sandwich 10 and the form 16 respectively, the thickness of the latter element being exaggerated for clarity. Conductors 25 and 26 respectively join the electrodes 23 and 24 to a suitable welding current power supply 27. As shown in Figure 3, the width of the electrode 24 is slightly less than the width of one of the bars 17 against which it abuts. It may, in certain instances, be desirable for the electrode 24 to be of greater or lesser width, as will be understood from the discussion hereinafter. The wheel electrodes 23 and 24 may be of a similar size and configuration but this is not critical. For clarity, suitable means for passing the electrodes 23 and 24 across the structure 10 and form 16 and advancing them to an adjacent strip of the bars 17 after each pass are not illustrated, it being understood that conventional devices may be utilized for these functions.

In operation, the electrodes 23 and 24 are rolled either laterally or longitudinally along the skin 11 and the bottom of the form 16, respectively, with suitable welding current being supplied by the power supply 27. The welding current passing between the electrode 23 and the sheet 11 will obviously be concentrated at the contact point therebetween, such concentrated current providing sufficient heating effects to efficiently weld the skin 11 to the edges of the core 13.

Concerning the flow of welding current between the electrode 24 and the lower skin 12, it will be evident that if the form 16 comprised a unitary metal element, such welding current would tend to diffuse laterally or spread out over a very large area before it entered the skin 12. This phenomenon would preclude the effective concentration of welding current necessary to provide sufficient heating for resistance welding between the edges of the core 13 and the skin 12. However, due to the use of the electrically independent bars 17, the welding current is effectively channeled to a relatively small area on the skin 12. The resulting current concentration provides an effective weld between the skin 12 and the edges of the core 13.

It will be evident that the width of the electrode 24 and its position with respect to the bars 17 determine the path of the welding current. Thus, if as shown in Figure 3 the width of the electrode 24 is less than that of the bars 17, with accurate alignment the welding current can be confined to a single bar since it will engage but one of them at any given time. However, in the event the path of the electrodes 23 and 24 is not so precisely determined, the electrode 24 may engage a pair of the bars 17 at the same time and if this is true, the bars 17 must be of such size that the area under two of them still provides a sufficient welding current concentration to efficiently weld the skin 12 to the core 13.

It will be understood that the invention is not limited to the use of wheel type electrodes since flat or other types of electrodes of suitable area may be utilized to engage the lower surface of the form 16, if desired.

Figure 4:
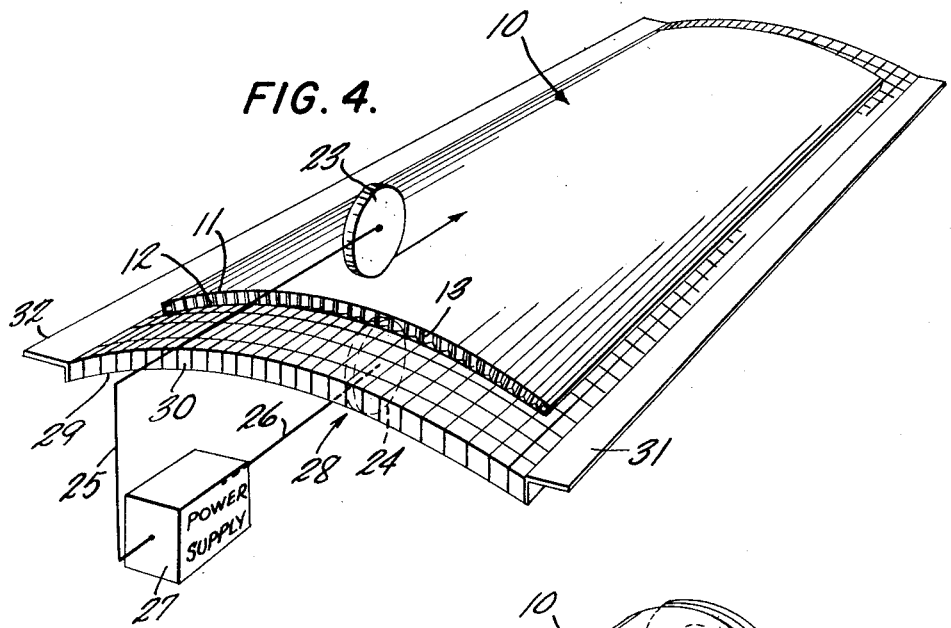
Figure 4 is a view in perspective of another embodiment of a metal form for supporting a composite structure for resistance welding.

Examining next the embodiment of the invention illustrated in Figure 4 in which elements similar to those in Figure 1 have been designated by like reference numerals, a form 28 is constructed of segments or blocks 29 to conform to the configuration of the lower skin 12 of the composite structure 10. An insulating adhesive in layers 30 between the segments 29 effectively secures them together in the form illustrated, supporting flanges 31 and 32 being secured to the edges of the form 28 by the same adhesive material.

The operation of this embodiment of the invention is similar to that described in connection with Figures 1 to 3, inclusive, except that the wheel electrodes 23 and 24 are passed longitudinally along the skin 11 and the form 28 instead of transversely, as discussed in connection with Figure 1. However, it will be understood that this is a matter of choice and that the electrodes in either embodiment may be passed in either direction as desired.

Figure 5:
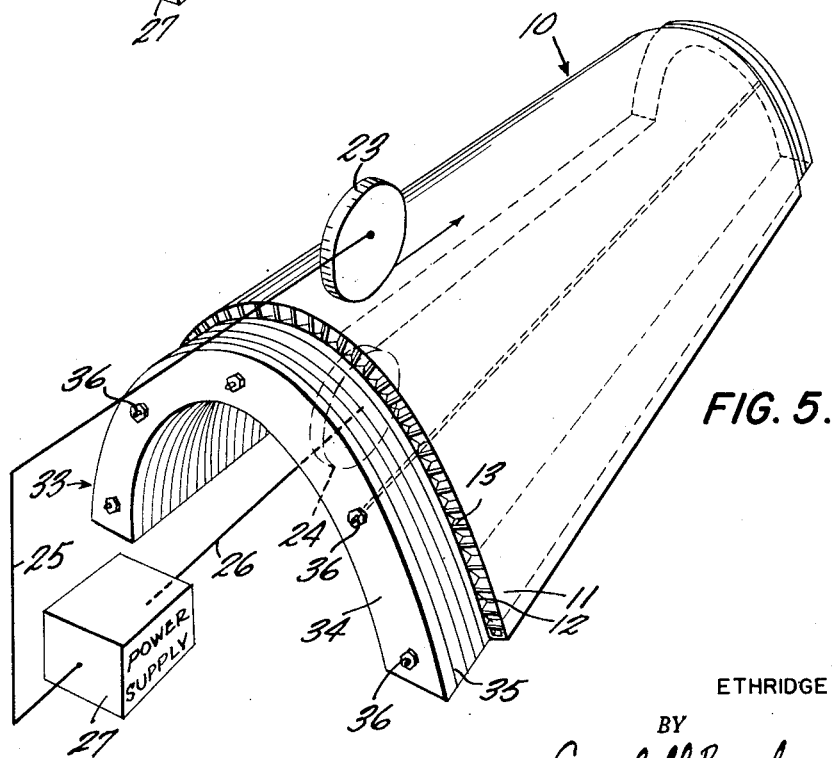
Figure 5 is a further metal form useful in supporting a composite structure having severe contours.

Considering next the modification of the invention illustrated in Figure 5 in which elements similar to those in Figures 1 to 4, inclusive, have been designated by like reference characters, a form 33 is illustrated that will support a metal sandwich 10 having an extreme curvature. Thus, although the forms 16 and 28 illustrated in Figures 1 and 4 may be constructed in any desired configuration, it may be desirable under certain circumstances to employ the principles described in connection with the form 33 if the sandwich 10 is to be rather severely curved. The form 33 is built up of a number of electrically independent arches 34 separated by layers of insulation 35, the entire assembly being joined by insulated tie rods 36.

In welding the structure 10 illustrated in Figure 5, the electrodes 23 and 24 are preferably passed longitudinally along the skin 11 and undersurface of the form 33. It will be apparent that this arrangement will permit some side diffusion of the welding current but the loss in heating effects between the skin 12 and the edges of the core 13 is not sufficient to interfere seriously with the resulting weld joint.

From the foregoing, it will be apparent that the principles of the present invention are applicable to any resistance welding process in which a metal form must be utilized to support the structure to be welded, one electrode being spaced the width of the form from the surface of such structure. Therefore, the above-described embodiments of the invention will be understood to be illustrative only and modifications thereof will occur to those skilled in the art. Accordingly, the invention is not to be limited to specific apparatus disclosed herein but is to be defined by the appended claims.

I claim:

1. A method of resistance welding comprising the steps of abutting a metal sheet against an edge of a metal element, supporting the metal sheet on one major face of a metal form having a plurality of electrically independent conductive paths between its two major faces, and passing welding current through a series circuit including the metal element, the metal sheet and the metal form to weld the metal element to the metal sheet.

2. A method of resistance welding comprising the steps of abutting a metal sheet against an edge of a metal core, supporting the sheet on one major face of a metal form having a plurality of electrically independent conductive paths between its two major faces, and passing welding current through a series circuit including the metal element, the metal core and the metal form to weld the metal core to the metal sheet.

3. A method of resistance welding comprising the steps of abutting a pair of metal sheets against both edges of a core extending therebetween, supporting one of the sheets on one major face of a metal form having a plurality of electrically independent conductive paths between its two major faces, and passing welding current through a series circuit including the other metal sheet, the core, the one metal sheet and the metal form to weld the metal core to the metal sheets.

4. Apparatus for resistance welding a metal sheet abutting an edge of a metal element comprising a metal form having one major face engaging and supporting the metal sheet, means dividing the form into a plurality of electrically independent sections extending between the major faces of the form that provides a like plurality of electrically independent conductive paths between said faces, said dividing means precluding lateral current flow between adjacent sections of the form, an electrode abutting against a portion of the other major face of the metal form, and means for flowing welding current through a series circuit including the metal element, the metal sheet and the metal form to weld the metal element to the metal sheet.

5. Apparatus for resistance welding a metal sheet abutting an edge of a metal core comprising a metal form having one major face engaging and supporting the metal sheet, layers of insulation dividing the form into a plurality of electrically independent sections extending between the major faces of the form that provide a plurality of electrically independent conductive paths between said faces, said layers of insulation precluding lateral current flow between adjacent sections of the form, an electrode abutting a portion of the other major face of the metal form, and means for flowing welding current through a series circuit including the metal core, the metal sheet, the metal form and the electrode to weld the core to the sheet.

6. Apparatus as defined in claim 5 in which the electrode abuts an area on the other major face of the metal form smaller than the surface area of one of said sections.

7. Apparatus for welding a pair of metal sheets to both edges of a core extending therebetween comprising a metal form having one major face engaging and supporting one of the metal sheets, means dividing the form into a plurality of electrically independent sections extending between the major faces of the form and permitting current flow between said faces, said dividing means precluding lateral current flow between adjacent sections of the form, a first electrode abutting the other metal sheet, a second electrode abutting a portion of the other major face of the metal form, and means for flowing welding current between the electrodes.

8. Apparatus as defined in claim 7 in which the second electrode abuts an area on the other major face of the metal form smaller than the area of one of said sections.

9. Apparatus as defined in claim 7 in which said electrodes comprise wheel-type electrodes simultaneously rolled along the other sheet and the other major face of the metal forms.

10. Apparatus for resistance welding a pair of metal sheets to both edges of a core extending therebetween comprising a metal form having one major face engaging and supporting one of the metal sheets, layers of insulation dividing the form into a plurality of electrically independent sections extending between the major faces of the form and permitting current flow between said faces, said insulation layers precluding lateral current flow between adjacent sections of the form, a first electrode abutting the other metal sheet, a second electrode abutting a portion of the other major face of the metal form, and means for flowing welding current between the electrodes.

11. Apparatus for resistance welding a pair of metal sheets to both edges of a metal core extending therebetween comprising a metal form having one major face engaging and supporting one of the metal sheets, layers of insulation dividing the form into a plurality of electrically independent sections of rectangular cross section extending between the major faces of the form permitting current flow between said faces, said insulation layers precluding lateral current flow between adjacent sections of the form, a first electrode abutting the other of said metal sheets, a second electrode abutting the other major face of the metal form, and means for flowing welding current between the electrodes.

12. Apparatus for resistance welding a pair of metal sheets to both edges of a metal core comprising a metal form having one major face engaging and supporting one of the metal sheets, layers of insulation dividing the form into a plurality of electrically independent strip like sections extending between a pair of edges of the form, the insulation layers permitting current flow between the major faces of the form and precluding lateral current flow between adjacent sections of the form, a first wheel-type electrode abutting the other of said metal sheets, a second wheel-type electrode abutting a portion of the other major face of the metal form, means for rolling the wheel electrodes along the sheet and the form perpendicular to the strip-like sections, and means for flowing welding current between the electrodes.

References Cited in the file of this patent
UNITED STATES PATENTS

| 2,108,795 | Budd | Feb. 22, 1938 |
| 2,194,687 | Biederman | Mar. 26, 1940 |
| 2,299,776 | Weightman | Oct. 27, 1942 |